United States Patent [19]

Whitehead et al.

[11] Patent Number: 4,716,615
[45] Date of Patent: Jan. 5, 1988

[54] WIPER ASSEMBLY

[76] Inventors: Charles L. Whitehead, 7224 Briarview, St. Louis, Mo. 63123; Lenwood C. Colvin, 5816 Nottingham Ave., St. Louis, Mo. 63109

[21] Appl. No.: 865,300
[22] Filed: May 21, 1986
[51] Int. Cl.⁴ .................. G01F 23/04; F01M 11/12
[52] U.S. Cl. .......................... 15/210 B; 15/244.1
[58] Field of Search ............ 15/209 R, 210 R, 210 B, 15/218.1, 244 R, 246

[56] References Cited

U.S. PATENT DOCUMENTS

| | | | |
|---|---|---|---|
| 2,855,682 | 10/1958 | Norgard | 15/210 B X |
| 3,387,314 | 6/1968 | Shirk | 15/210 B |
| 4,017,935 | 4/1977 | Hernandez | 15/210 B |
| 4,233,704 | 11/1980 | Sartorio | 15/210 B |
| 4,419,781 | 12/1983 | Meegan | 15/210 B |
| 4,422,204 | 12/1983 | Long | 15/210 B |

*Primary Examiner*—Donald Watkins
*Attorney, Agent, or Firm*—Haverstock, Garrett & Roberts

[57] ABSTRACT

A novel wiper assembly suitable for use in checking fluid levels by a dip stick comprising a pad holding frame having a fluid absorbent pad mounted therein, a shaft on which the pad holding frame is adjustably mounted and a mounting clip integral with the opposite end of said shaft. The wiper assembly is adapted for mounting on a dip stick receptacle tube, optionally of two different sizes, and is desirably constructed wholly of plastic materials.

18 Claims, 7 Drawing Figures

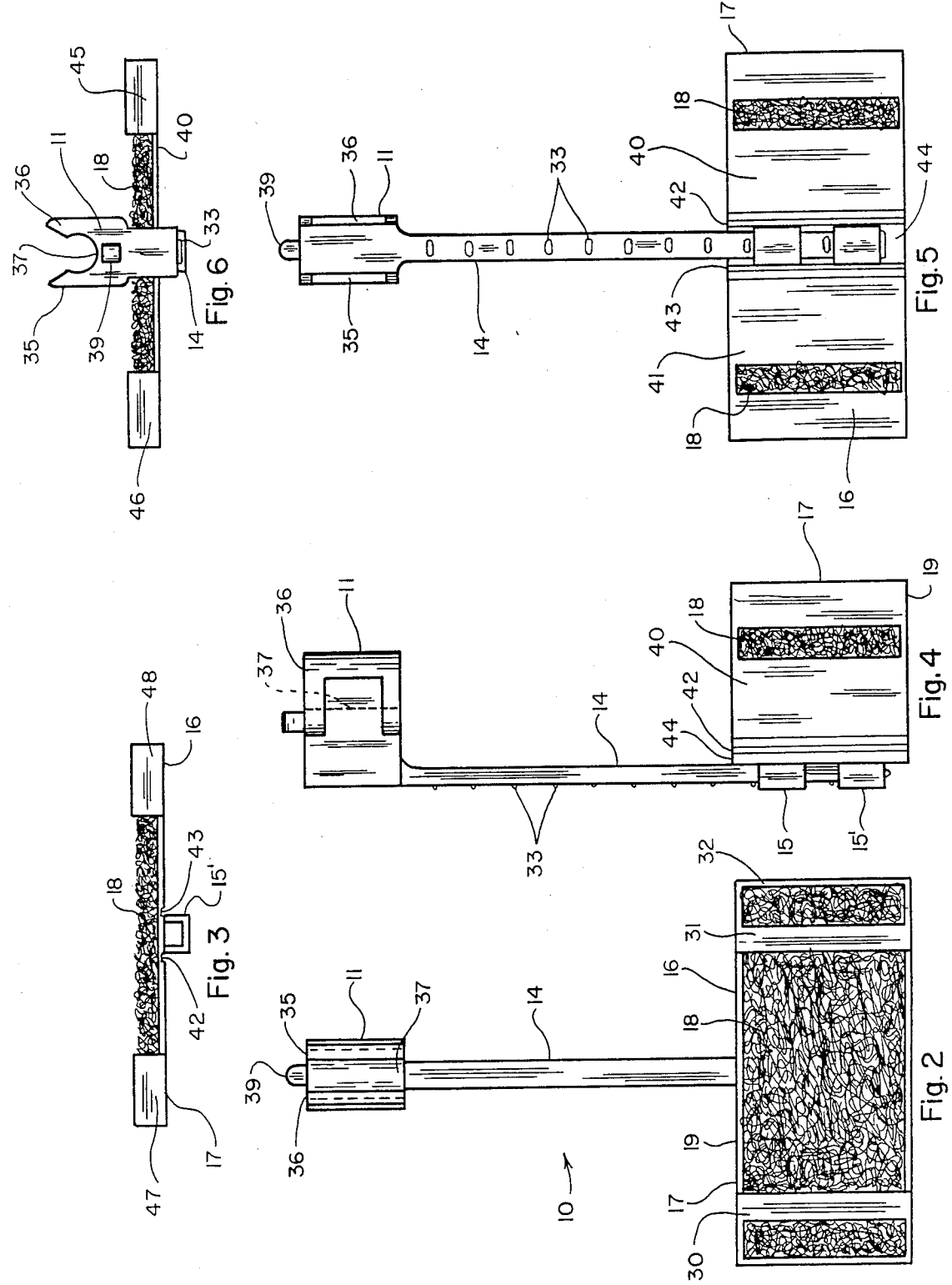

WIPER ASSEMBLY

The present invention relates to a novel wiper assembly for use in rapidly checking fluid levels, by a dip stick, in automotive and other engines, transmissions and the like while keeping hands and fingers free of the fluids, and more particularly, to a convenient, permanently mountable and adjustable wiper assembly which can be cleaned and reused and allows such rapid checking of fluid levels in a clean, efficient and safe manner.

For many years it has been the practice of filling station attendants, motorists and others desiring to check fluid levels such as crankcase lubricating oils, transmission fluids and other cooling, lubricating and power transmission fluids in automotive and other operating equipment, engines, transmissions and the like to employ a wiping rag, paper towel or other hand-held wiping means to clean a fluid dip-stick before reading the fluid level thereon. Frequently the checker also again wiped off the dip stick before finally reinserting and seating it in its receptacle tube. This has frequently resulted in oil or other stains on the hands, fingers, clothing and vehicle finishes. It has also been a slow and time-consuming practice, since a rag or paper towel must first be located and obtained.

The use of the wiper assembly of the present invention avoids these difficulties and possible messy spills and stains. It can be permanently mounted and cleaned for reuse. It can be easily and economically produced from low cost materials and, thus, made available at reasonable prices.

Accordingly, it is a principal object of the present invention to provide a wiper assembly for checking fluid levels quickly, easily and without oily mess.

Another object is to provide such a wiper assembly which can be easily and permanently mounted.

Another object is to provide a wiper assembly which is adjustable.

Another object is to provide a wiper assembly which can be readily cleaned and reused.

A still further object is to provide a wiper assembly which is constructed from economical materials.

These and other objects and advantages will become apparent after consideration of the following specification in conjunction with the accompanying drawings, wherein:

FIG. 2 is a front elevation view of the unmounted and open wiper assembly of FIG. 1:

FIG. 3 is a top plan view of the wiper assembly of FIG. 2;

FIG. 4 is a side elevation view of the closed wiper assembly of FIG. 2;

FIG. 5 is a back elevation view of the same wiper assembly;

FIG. 6 is a bottom elevation view of the same wiper assembly; and

Figures 1, 7:
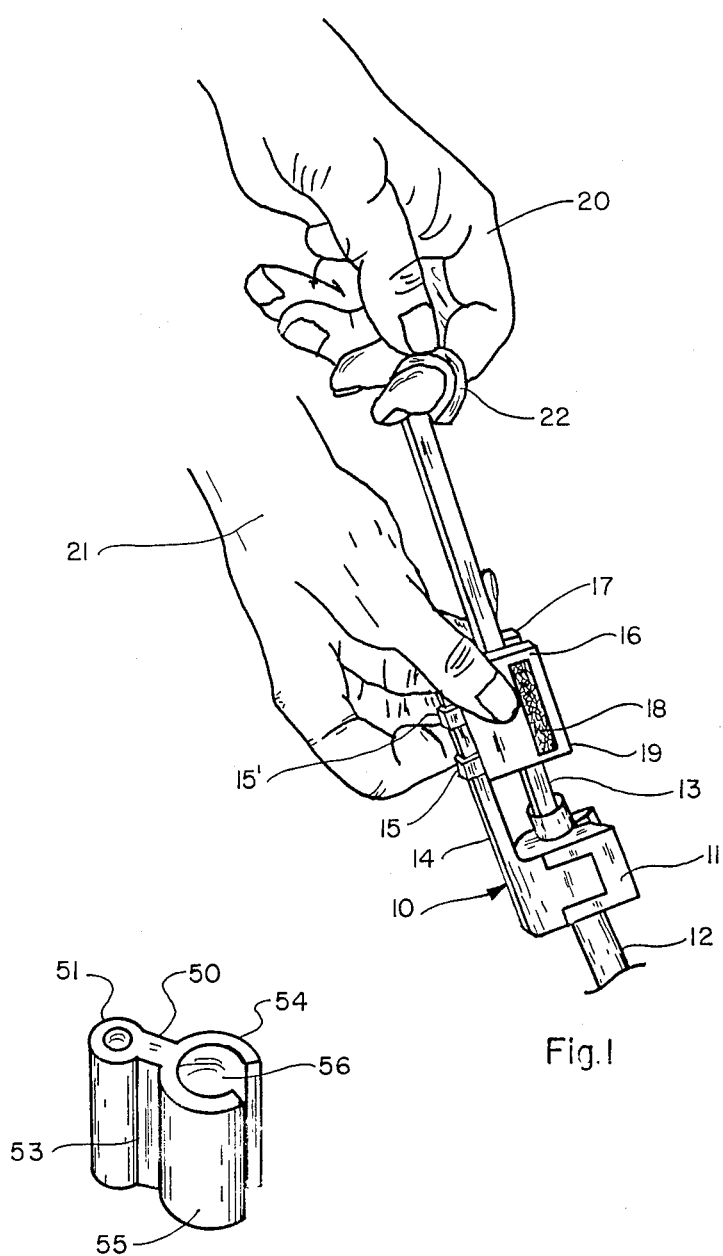
FIG. 1 is a perspective view of the wiper assembly of the present invention illustrating the mounting and use thereof.
FIG. 7 is a perspective view of an optional mounting adapter for use in mounting said wiper assembly of FIG. 2 on larger dip stick receptacle tubes.

Referring to the drawings, more particularly by reference numbers wherein like numerals refer to like parts, number 10 in FIG. 1 identifies a wiper assembly constructed in accordance with the teachings of the present invention. As shown in use in FIG. 1 wiper assembly 10 may be seen to comprise three major parts or sections. A pad holding frame 19 having two major folding side panels 16 and 17 and containing a wiping pad 18 is mounted on a shaft 14 by means of brackets 15 and 15'. At the opposite end of shaft 14 and integral therewith mounting clip 11 holds said assembly 10 onto a dip stick receiving tube 12 near its upper and open end. The shaft 14 is of non-circular cross-section, preferably of rectangular cross-section, as shown, which serves to prevent pad holding frame 19 from vibrating or otherwise moving out of alignment with the said receiving tube 12. As shown in operation in FIG. 1 by a person checking a fluid level one hand 21 compresses the two flexible side panels 16 and 17 of pad holding frame 19 together about a dip stick 13 in order to bring the two side portions of an absorbent pad 18 into contact with both faces of dip stick 13 while the person's other hand 20 is withdrawing dip stick 13 by means of its pull ring 22. It will be seen that by the action of the absorbent pad 18 the side portions of which are in contact with the respective opposite faces of dip stick 13 any film of oil on dip stick 13 will be effectively removed enabling an accurate reading of fluid level upon reinserting the wiped dip stick into the fluid being checked. Thus none of the film or droplets of oil adhered to dip stick 13 will contact or be dripped on the hands of the person checking the level or on the surrounding parts of equipment near or below the dip stick 13 and its receiving tube 12.

The construction of wiper assembly 10 is shown in more detail in FIGS. 2 thru 6 as will be described below. FIG. 2 shows the wiper assembly 10 in assembled, but open condition. The pad holding frame 19 is shown in a form of a shallow rectangular box having two side panels 16 and 17. The shallow box form has upstanding side walls 32 and absorbent pad 18 of rectangular shape is seated within pad holding frame 19. The pad 18 is held in place by means of pad retaining bands 30 and 31. The pad holding frame 19 is mounted, preferably adjustably mounted, on shaft 14 as shown in more detail in FIGS. 4 and 5. At the opposite end of shaft 14 and formed intergrally therewith is mounting clip 11 which is comprised of side members 35 and 36 which define a generally semi-cylindrical opening 37 adapted to fit about cylindrical dip stick receiving tube 12. Ear or stop 39 formed in the base of mounting clip 11 serves to position clip 11 above any mounting brackets for receiving tube 12.

FIG. 4 which is a side elevation view and FIG. 5 which is back elevation view of the wiper assembly 10 show in more detail the means of mounting pad holding frame 19 onto shaft 14 in an adjustable manner. In FIG. 4 it may be seen that rigid back section 40 of panel 17 of holding frame 19 is joined to a rigid center section 44 by means of flexible section 42. Center section 44 has formed intergral therewith one or more brackets 15 and 15' adapted to engage shaft 14, while shaft 14 has formed intergral therewith a plurality of protuberant bars 33 shown evenly spaced down the length of said shaft 14. The protuberant bars 33 are adapted to engage the edges of brackets 15 and 15' to fix the position of pad holding frame 19 on shaft 14 at any selected position up and down shaft 14. Thus the distance between the pad holding frame 19 and the mounting clip 11 can be selected and varied at will. The same features described above can also be seen in FIG. 5, the back elevation view of the subject wiper assembly, which shows both side folding panels 16 and 17 of said frame 19 as joined by flexible sections 42 and 43 to rigid center section 44.

Rigid back sections 40 and 41 of folding panels 16 and 17 are of sufficient size for gripping and folding panels 16 and 17 without contacting absorbent pad 18 which may become saturated with the fluids being removed from dip stick 13.

FIG. 3, which is a top elevation view of the subject assembly, shows some of the same features as well as top end walls 47 and 48 of folding panels 17 and 16 of pad holding frame 19.

FIG. 6 is a bottom elevation view of the assembly showing in detail the shape of mounting clip 11 including side members 35 and 36 and a generally semi-cylindrical opening 37 defined thereby. There are also shown bottom end walls 45 and 46 of the folding side panels 16 and 17 of pad holding frame 19.

FIG. 7 is a perspective view of an optional mounting adapter 50 comprising a semi-cylindrical sectin 51 of the approximate diameter of opening 37 in mounting clip 11 joined by a solid wall section 53 to a partially cylindrical open-sided clip section comprised of arc-shaped segments 54 and 55 defining a second and larger diameter semi-cylindrical opening 56 adapted to engage a larger diameter receiving tube 12. Thus, by the use of optional mounting adapter 50 the subject wiper assembly 10 can be conveniently mounted on a larger size dip stick receiving tube 12 if the equipment in which the fluid level is to be determined is so equipped.

The novel wiper assembly of the present invention, with the exception of the absorbent pad 18, can be constructed of any convenient materials including metals or plastics. It is preferred however that the subject wiper assembly be constructed entirely of plastic materials. Thus the pad holding frame 19 including the three rigid back sections thereof 40, 41 and 44 as well as thinner flexible sections 42 and 43 can be molded as one piece of plastic material. Likewise, the mounting clip 11 and the shaft 14 integral therewith can be molded as a single piece of plastic. Any suitable plastic polymers having the requisite strength and, in thin section, the requisite flexibility for sections 42 and 43 can be employed, including polyolefins, such as polyethylene, polypropylene, or copolymers of polyethylene and polypropylene, polyamides such as nylon 66 or nylon 6 or polyesters such as polyethylene terephthalate. The optional mounting adapter 50 can also be molded from any of the same materials.

The absorbent pad 18 can be composed of a felt material or of a plastic foam material. An entirely suitable foam material is polyurethane foam. The pad should be sufficently compressible to be easily inserted and removed from the pad holding frame for cleaning when it has become saturated with waste fluids and for reinsertion for reuse of the wiper assembly. A pad of polyurethane foam sized to fit the pad holding frame and of approximately ¼ to ⅜ of an inch in thickness has been found entirely suitable for use in the subject wiper assembly.

As described above when mounted on the dip stick receiving tube and used as designed the wiper assembly of the present invention enables a person to clean a dip stick to get accurate fluid level readings while at the same time avoiding wipes, spills, and stains of fluid residues on the hands, clothing or the exterior of the equipment in which the fluid level is being measured. Furthermore, the absorbent pad used in the subject wiper assembly is suitable for removal for cleaning when it has become saturated with the fluids being measured and for reinsertion and continued use of the wiper assembly.

Thus there has been shown and described a novel wiper assembly for use in measuring the fluid levels in various items of operating equipment, which assembly fulfills all the objects and advantages sought therefor. Many changes, modifications, variations and other applications of the present invention will, however, become apparent to those skilled in the art after considering this specification and the accompaning drawings, and all such changes, modifications, variations and other applications which do not depart from the spirit and scope of the invention are deemed to be covered by the invention which is limited only by the claims which follow.

What is claimed is:

1. A wiper assembly comprising a frame member, said frame member including a central portion and connected side frame portions, a wiping pad disposed within said frame member with portions within each of said side frame portions, said side frame portions being pivotally engaged to said central portion and pivotal between an open position and a closed position wherein said wiping pad portions in said side frame portions substantially abut, mounting means including a mounting clip adaptable for engagement with a dip stick tube, said mounting means including shaft means adjustably engaged to said frame member whereby said wiping pad portions are positioned substantially adjacent to an open end of a dip stick tube and when said side frame portions are in said closed position said wiping pads contact and wipe a dip stick as the dip stick is withdrawn from the dip stick tube.

2. The wiper assembly of claim 1 constructed wholly of plastic materials.

3. The wiper assembly of claim 1 wherein said wiping pad is a pad of polymeric foam material.

4. The wiper assembly of claim 3 wherein said wiping pad is a pad of polyurethane foam.

5. The wiper assembly of claim 1 wherein said wiping pad is removable from said frame member.

6. The wiper assembly of claim 1 wherein said shaft is of non-circular cross-section.

7. The wiping assembly of claim 1 wherein said frame member is mounted on said shaft by bracket means.

8. The wiper assembly of claim 1 wherein said frame member is movable along said shaft for adjustment relative to the mounting clip.

9. The wiper assembly of claim 7 wherein said shaft includes a plurality of protuberant bars for selective cooperation with said bracket means.

10. The wiper assembly of claim 1 wherein said mounting clip is adapted to resiliently engage a round dip stick receiving tube.

11. The wiper assembly of claim 1 wherein said frame is a one-piece plastic molding having three relatively rigid sections joined by two relatively flexible sections.

12. The wiper assembly of claim 1 including a mounting adapter comprising a one-piece plastic molding having a semi-cylindrical section of a diameter adapted to press fit within said mounting clip integrally joined to a second and different diameter partially cylindrical open-sided clip.

13. A device for use in removing oil and other materials from a dip stick used to indicate fluid level in a crankcase or like device comprising:

a. an open frame structure having a central portion and spaced connected side frame portions, the side frame portions being pivoted on the central portions between an open position spaced from each other and a closed position wherein the side frames are substantially adjacent one another,
b. a fluid absorbent member positioned in the open frame and confined by the side frame portions, said absorbent member having side portions in the respective side frame portions and a portion that extends therebetween and across the central portion,
c. means to mount said open frame adjacent to the open end of a dip stick tube whereby the side frame members can be moved to the closed position when the dip stick is withdrawn from the dip stick tube so that the fluids on the dip stick can be wiped from the dip stick, said mounting means including a clip portion adapted to resiliently engage the dip stick tube and an elongated member extending integrally from the clip portion, and
d. means on the open frame for cooperative engagement with the elongated member to support the open frame in spaced relation adjacent to the open end of the dip stick tube.

14. The device of claim 13 wherein the elongated member is of non-circular cross section and the means on the open frame for cooperative engagement therewith include means forming an opening therethrough of substantially the same cross-sectional shape and size as the cross-sectional shape and size of the elongated member.

15. The device of claim 14 wherein the elongated member is of rectangular cross-section and the means on the open frame for cooperative engagement therewith include bracket means forming an opening therethrough of substantially the same rectangular cross-sectional shape and size as the rectangular cross-sectional shape and size of said elongated member.

16. The device of claim 14 wherein the elongated member is of non-circular cross-section and the means for engagement thereof with the open frame engagement means include a plurality of selective stop means adapted to selectively and cooperatively engage the said means on the open frame.

17. The device of claim 16 wherein the said selective stop means comprise a plurality of protuberant bars.

18. A wiper assembly adapted for wiping fluid from a dip stick comprising a pad holding frame having a fluid absorbent pad mounted therein, a shaft on which said pad holding frame is mounted, said pad holding frame being mounted on said shaft by bracket means, said shaft extending from the frame to an opposite end and including a plurality of spaced protuberances for selective cooperation with said bracket means, a mounting clip integral with the opposite end of said shaft, said pad holding frame being movable along said shaft for adjustment relative to said mounting clip, and said pad holding frame being a one-piece plastic molding having three relatively rigid sections joined by two relatively flexible sections.

* * * * *